(12) United States Patent
Xythalis et al.

(10) Patent No.: US 10,140,659 B2
(45) Date of Patent: Nov. 27, 2018

(54) TRANSACTION PROCESSOR FOR CLEARING INTEREST RATE SWAPS WITH IMPROVED EFFICIENCY

(71) Applicant: Chicago Mercantile Exchange Inc., Chicago, IL (US)

(72) Inventors: Panagiotis Xythalis, Chicago, IL (US); Jay Zhu, Livingston, NJ (US); Fateen Sharaby, Chicago, IL (US); Dhiraj Bawadhankar, Chicago, IL (US); Molang Dong, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 444 days.

(21) Appl. No.: 14/877,658

(22) Filed: Oct. 7, 2015

(65) Prior Publication Data
US 2016/0140657 A1      May 19, 2016

Related U.S. Application Data

(60) Provisional application No. 62/079,690, filed on Nov. 14, 2014.

(51) Int. Cl.
   *G06Q 40/04*         (2012.01)

(52) U.S. Cl.
   CPC .................... *G06Q 40/04* (2013.01)

(58) Field of Classification Search
   CPC ......... G06Q 40/04; G06Q 40/06; G06Q 40/08
   See application file for complete search history.

(56) References Cited

U.S. PATENT DOCUMENTS 6,304,858 B1 * 10/2001 Mosler ............... G06Q 30/0601
                                                                  705/35
7,565,316 B1 *  7/2009 Amin .................... G06Q 40/04
                                                                  705/37

(Continued)

FOREIGN PATENT DOCUMENTS

WO     WO-2006103474 A2 * 10/2006 ............. G06Q 40/04

OTHER PUBLICATIONS

Fu, Yee-Tien: Derivative Security Markets: Currency and Interest Rate Swaps, 2009, MS & E247s International Investments, Standford.edu, pp. 1-82 (Year: 2009).*

(Continued)

*Primary Examiner* — Bijendra K Shrestha
(74) *Attorney, Agent, or Firm* — Lempia Summerfield Katz LLC

(57) ABSTRACT

The disclosed embodiments relate to improving the efficiency of an electronic trading system for interest rate swaps ("IRS") by allowing for IRS contracts to be funded in a base currency while the cash flows, e.g. coupon payments, price alignment interest, variation margin, are denominated in a local currency different from the base currency. Thereby cash flows may be netted and offset minimizing the magnitude of funds needed to be moved and reducing the number of transactions processed by the electronic trading system as well as the consumption of computational resources thereby. Furthermore, the disclosed embodiments facilitate entering into IRS transactions is a currency different from the currency of cash flows while eliminating Herstatt risk due to volatility of foreign exchange rates, which allows for increased offshore participation and thereby increased transaction volume.

32 Claims, 5 Drawing Sheets

(56) References Cited

U.S. PATENT DOCUMENTS

| | | | | |
|---|---|---|---|---|
| 2005/0192898 | A1* | 9/2005 | Hache | G06O 20/102 705/40 |
| 2007/0239589 | A1* | 10/2007 | Wilson, Jr. | G06Q 40/04 705/37 |
| 2013/0282547 | A1* | 10/2013 | Nyhoff | G06Q 40/04 705/37 |
| 2014/0032443 | A1* | 1/2014 | Ossanna | G06Q 40/04 705/36 R |
| 2014/0067639 | A1* | 3/2014 | MacWilliams | G06Q 40/04 705/37 |
| 2014/0229351 | A1* | 8/2014 | Lutnick | G06Q 40/04 705/37 |
| 2016/0035024 | A1* | 2/2016 | Yin | G06Q 40/04 705/37 |

OTHER PUBLICATIONS

Ifci, Switzerland: Impact Netting on Credit, Liquidity and Systemic Risk, Feb. 1, 2001, pp. 1-7 (Year: 2001).*

Gilbert, R.: Implications of Netting Arrangements for Bank Risk on Foreign Exchange Transactions, Mar. 2, 2003, pp. 1-14 (Year: 2003).*

Laurent et al.,: An overview of the valuation of collateralized derivative contract, Aug. 28, 2014, REv Deriv Res vol. 17, pp. 261-286. (Year: 2014).*

Whiteley, Christopher: G-20 reforms, hedging and cover bonds, 2012, Capital Markets Law Journal, vol. 7, No. 2, pp. 151-168. (Year: 2012).*

MFX: Understanding Cross Currency Swaps, Nov. 14, 2008, Web Archives, pp. 1-6. (Year: 2008).*

Anella Munro et al., "Motivations for Swap-Covered Foreign Currency Borrowing", BIS Papers No. 52, Aug. 2009, pp. 145-185.

Bill Hodgson, Price Alignment Interest, OTC Space, Oct. 5, 2012, 6 pages.

Derivative Processing Under the Dodd-Frank Act and European Market Infrastructure Reform (EMIR), Cleared Swap Handbook, BNY Mellon, Jun. 2013, 15 pages.

Gerald Gay et al., "The Pricing and Valuation for Swaps", E-Book, Financial Derivatives: Pricing and Risk Management, Chapter 28, Oct. 2009, 21 pages.

Paul C. Harding, "The ISDA 2013 Standard Credit Support Annex", Derivatives Documentation Limited, Aug. 27, 2013, 5 pages.

Stu McClymont, Price Alignment Interest (PAI), The OTC Space, 2015, 4 pages.

Extended European Search Report, from EP Application No. 15189429.2, dated Mar. 14, 2016, EP.

* cited by examiner

TRANSACTION PROCESSOR FOR CLEARING INTEREST RATE SWAPS WITH IMPROVED EFFICIENCY

REFERENCE TO RELATED APPLICATIONS

This application claims the benefit of the filing date under 35 U.S.C. § 119(e) of U.S. Provisional Application Ser. No. 62/079,690 filed Nov. 14, 2014, which is hereby incorporated by reference.

BACKGROUND

A financial instrument trading system, such as a futures exchange, referred to herein also as an "Exchange", such as the Chicago Mercantile Exchange Inc. (CME), provides a contract market where financial instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Typically, the Exchange provides for a centralized "clearing house" through which all trades made must be confirmed, matched, and settled each day until offset or delivered. The clearing house is an adjunct to the Exchange, and may be an operating division of the Exchange, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. Essentially, the transaction between the buyer and seller is bifurcated into two separate transactions, one between the buyer and the Clearing House and another transaction between the seller and the Clearing House. These transactions are not dependent on each other. That is, as the Clearing House guarantees performance to either party, should the buyer or seller default or otherwise fail to perform their obligation under their transaction with the clearing house, the other party's transaction remains unaffected. The Clearing House protects itself from loss by requiring each party to post a performance bond to cover the potential risk of loss of that party to the Clearing House. As any given party's risk of loss may change over time, going up or down, the Clearing House further periodically, e.g. daily, calculates adjustments to the risk of loss and the performance bond, referred to as "variation margin", and credits or debits the party accordingly. A clearing member is a firm qualified to clear trades through the Clearing House for itself, referred to as production trades, or on behalf of their customers.

An interest rate swap is a well-known financial transaction typically occurring between two parties. In a swap, the two parties agree to make payments to each other; the payments of the first and second parties define the type of swap. In a basis swap, the payments made by the first and second parties are based on different floating interest rates in the same currency. In a currency swap, the payments are made based on either fixed and/or floating interest rates in different currencies. In an interest rate swap, the payments made by the parties are in the same currencies, but one of the payments is based on a fixed interest rate while the other payment is based on a floating interest rate. The two parties to the interest rate swap are called counterparties.

One purpose of an interest rate swap is as a hedge from changing interest rates; however, such hedge results in an added cost. In an interest rate swap, while one party is often hedging against potential losses, the other party is often seeking financial gain based on speculation that the added cost paid by the hedging party will be greater than the actual change in value due to the interest rate change.

The payments made between the parties in an interest rate swap are based on interest rates; however, the interest rate is only one factor in determining the amount of payment. Another factor is the amount of principal which is periodically multiplied by the different interest rates to determine the payments made. In an interest rate swap, there is no exchange or payment of principal, so the principal is referred to as being a notional amount. This notional amount dictates the size of the interest payments and is agreed on by the parties when negotiating the terms of the interest rate swap. The notional amount remains constant for the duration of the swap.

For example, an exemplary interest rate swap could be between a first dealer (for example, a typical bank which is relatively small in size) which desires to reduce the risk of interest rate fluctuation and a second dealer (for example, a large financial institution) which is willing to accept a risk in interest rate fluctuation in return for receiving a higher fixed interest rate. The first dealer agrees to pay the second dealer interest payments that are based on a long term fixed rate. In exchange, the second dealer agrees to pay the first dealer interest payments that are based on a short term floating rate. Thus, the first dealer and the second dealer are counterparties.

Typically, the floating interest rate is tied to the London Interbank Offered Rate (LIBOR), which is the rate of interest at which banks can borrow funds from other banks, in marketable size, in the London Interbank market and is set by the British Bankers' Association, Pinners Hall, 105-108 Old Broad Street, London EC2N 1EX United Kingdom, a trade association representing banks and other financial services firms that operate in the United Kingdom. If the first dealer and the second dealer enter into a swap over a longer-term period (for example five (5) years), the first dealer pays out interest to the second dealer according to the fixed rate over that period (e.g. five years at the five-year fixed rate) and receives interest from the second dealer according to a floating shorter-term rate (for example, the three-month LIBOR rate) over that same period. Conversely, the second dealer receives interest payments from the first dealer according to the fixed long-term rate and pays interest payments to the first dealer based on the floating short-term rate. Both the fixed long-term rate and the LIBOR rate are applied to a common notional principal. Alternatively, both series of cash flows could be based on different floating interest rates, that is, variable interest rates that are based upon different underlying indices. This type of interest rate swap is known as a basis or a money market swap.

Before entering into an interest rate swap contract, the first dealer and the second dealer may try to value the price of the interest rate swap. The value of an interest rate swap is the difference between the net present value of the two future income streams that are swapped by the first dealer and the second dealer. Because the floating interest rate varies in the future, the size of each future cash flow based on the floating interest rate is not known to either the first dealer or the second dealer. To solve this problem, the swap market uses forward implied interest rates to estimate the net present value of the fixed and floating interest rates. The forward interest rates may be derived from convexity adjusted Eurodollar Futures rates for example, or benchmark swap rates promulgated by the International Swap Dealers Association (ISDA) 360 Madison Avenue, 16th Floor, New York, N.Y. 10017 USA, a global trade association representing participants in the privately negotiated derivatives industry. The ISDA also provides a legal master documentation for interest rate swap transactions (available at http://www.isda.org/cl.html). ISDA agreements are essential for each new counterparty, and amendments to agreements are required for each new deal with a particular counterparty.

Thus, an interest rate swap is effectively a construction of two cash flow streams with the same maturity. In a "vanilla" fixed for floating interest rate swap one of the cash flow streams is comparable to that of a bond (fixed interest rate payments) and the other cash flow stream is comparable to a periodically revolving borrowing/lending facility or floating rate note (floating interest rate payments). Mathematical analysis shows that the net present value of an interest rate swap has interest rate sensitivity similar to the price of a bond having a similar coupon, maturity, and credit rating.

The similarities between in the interest rate sensitivities of "vanilla" interest rate swaps and bonds explains the heavy use of government bond futures, government bond repos, and the cash market to manage interest rate risk resulting out of interest rate swap transactions; this practice, however, also involves disadvantages. Initially, both market segments are based on different credits and therefore an unexpected change in the yield differential of the two markets could result in heavy losses. In addition, conventional techniques require efficient access to the bond and repo market. Specifically, repo transactions can be problematic since these transactions have to be renegotiated on a regular basis and market conditions can be volatile.

An interest rate swap ("IRS") is a contractual agreement between two parties, i.e., the counterparties, also referred to as the payer and receiver, where one stream of future interest payments is exchanged for another, e.g., a stream of fixed interest rate payments in exchange for a stream of floating interest rate payments, based on a specified principal amount or an assumed notional amount. An IRS may be used to limit or manage exposure to fluctuations in interest rates. One common form of IRS exchanges a stream of floating interest rate payments on the basis of the 3-month London interbank offered rate ("LIBOR") for a stream of fixed-rate payments on the basis of the swap's fixed interest rate. Another common form of IRS, known as an overnight index swap, exchanges, at its termination, a floating rate payment determined by daily compounding of a sequence of floating interest rates on the basis of an overnight interest rate reference (e.g., the US daily effective federal funds rate, or the European Overnight Index Average (EONIA)) over the life of the swap, for a fixed rate payment on the basis of daily compounding of the overnight index swap's fixed interest rate over the life of the swap.

The components of a typical IRS may be defined in a swap confirmation which is a document that is used to contractually outline the agreement between the two parties. The components defined in this agreement may include:

Notional—The fixed and floating coupons are paid out based on what is known as the notional principal or just notional. If one were hedging a loan with $1 million principal with a swap, then the swap would have a notional of $1 million as well. Generally the notional is never exchanged and is only used for calculating cash flow amounts;

Fixed Rate—This is the rate that will be used to calculate payments made by the fixed payer. This stream of payments is known as the fixed leg of the swap;

Coupon Frequency—This is how often coupons would be exchanged between the two parties, common frequencies are annual, semi-annual, quarterly and monthly though others are used such as based on future expiry dates or every 28 days. In a vanilla swap the floating and fixed coupons would have the same frequency but it is possible for the streams to have different frequencies;

Business Day Convention—This defines how coupon dates are adjusted for weekends and holidays. Typical conventions are Following Business Day and Modified Following;

Floating Index—This defines which index is used for setting the floating coupons. One common index is LIBOR. The term of the index will often match the frequency of the coupons. For example, 3 month LIBOR would be paid Quarterly while 6 month LIBOR would be paid Semi-Annually;

Daycount conventions—These are used for calculating the portions of the year when calculating coupon amounts;

Effective Date—This is the start date of a swap and when interest will start accruing on the first coupon; and Maturity Date—The date of the last coupon and when the obligations between the two parties end.

Currently, most IRS's are entered into on a bilateral, principal-to-principal basis, i.e. outside of an exchange (referred to as "over the counter" or "OTC") with each ultimate counterparty being the entity with whom the other party executed the trade. As opposed to trades, such as trades in futures contracts, which are cleared via a clearing house, as described above, OTC derivatives may be booked bilaterally between the counterparties, as opposed to cleared derivatives which are booked with a clearing house. OTC bilateral derivatives counterparties, such as those involved in a IRS agreement, therefore assume credit exposure, known as counterparty credit risk, to each other while cleared derivatives counterparties are exposed to credit risk of the clearing house. Second, cleared derivatives always involve the posting of margin to the clearing house by the parties to a trade, while margining by OTC bilateral derivatives counterparties is subject to negotiation by the parties. Finally, the terms of OTC bilateral derivatives can be customized to fit the needs of the contracting parties. The terms of cleared derivatives, in contrast, typically involve a high degree of standardization to facilitate the computation of required margin amounts.

Within the interest rate swap market, bilateral netting agreements facilitate netting of positions between specific counterparties by reducing credit exposure and freeing up capital; however, it is difficult, if not impossible, for participants to freely net deals across multiple counterparties. Further, it is time consuming and cumbersome to settle each agreement separately, and there is no guarantee that the cancellation or assignment of a particular contract provides the best price.

Central clearing is designed to standardize certain swaps, promote transparency, and allow market participants to mitigate their counterparty credit risk to dealers. Accordingly, it is advantageous to centrally clear OTC IRS's.

DETAILED DESCRIPTION

Figure 1:
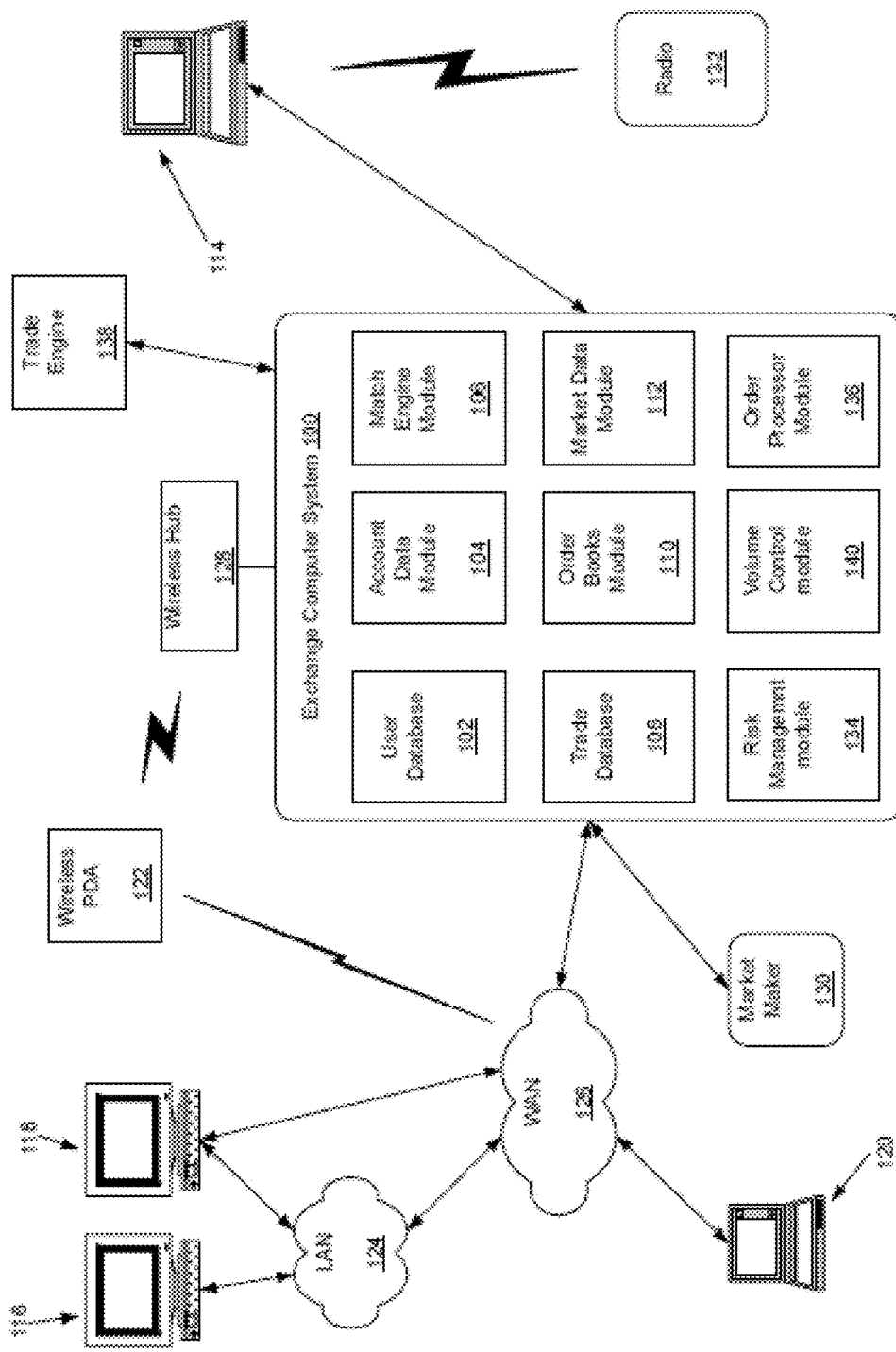
FIG. 1 depicts an illustrative computer network system that may be used to implement aspects of the disclosed embodiments.

The disclosed embodiments relate to improving the efficiency of an electronic trading system for interest rate swaps ("IRS") by allowing for IRS contracts to be funded in a base currency while the cash flows, e.g. coupon payments, price alignment interest, variation margin, are denominated in a local currency different from the base currency. Thereby cash flows may be netted and offset minimizing the magnitude of funds needed to be moved and reducing the number of transactions processed by the electronic trading system to effect those cash flows as well as the consumption of computational resources thereby. Furthermore, the disclosed embodiments facilitate entering into IRS transactions is a currency different from the currency of cash flows while eliminating Herstatt risk due to volatility of foreign exchange rates, which allows for increased off shore participation and thereby increased transaction volume.

As discussed above, an IRS generally consists of a contractual agreement between two parties, i.e., the counterparties, also referred to as the payer and receiver, where one stream or series of future interest payments is exchanged for another, e.g., a stream/series of fixed interest rate payments in exchange for a stream/series of floating interest rate payments, based on a specified principal amount or an assumed notional amount. The payments are referred to as "coupons." In a plain IRS contract, as opposed to a cross-currency swap, both series of payments occur in a single currency, e.g. dollars, Euros, etc., which is specified by the IRS contract, and generally, the party making a particular payment funds that payment in the requisite currency. However, in certain situations, as will be described in more detail below, a party may desire to fund their payment in a different currency then required by the IRS contract and will therefore need to convert their funding to the requisite currency in order to make the payment and satisfy their obligation under the IRS agreement, e.g. they will have to buy, using their base currency, the requisite amount of the local currency that they need per the contract. Similarly, a party may desire to receive a payment owed in a currency different from the currency specified in the IRS contract and will therefore need to convert the received payment to their desired currency upon receipt, e.g. sell the local currency in exchange for their base currency. As the process of paying and receiving a coupon payment, as well as the conversion between currencies, is not instantaneous, changes in the rate of exchange between currencies presents a risk to either party until the transaction is completed. This is referred to as Herstatt risk. Herstatt risk, also known as cross-currency settlement risk or foreign exchange risk is the risk that a party to a trade fails to make payment even though it has been paid by its counterparty.

As was discussed above, it is desirable to clear OTC IRS contracts in order to standardize certain swaps, promote transparency, and allow market participants to mitigate their counterparty credit risk to dealers. Clearing introduces additional complexities related to the mitigation of risk. In particular, in order to protect the clearing organization/central counter party ("CCP"), the CCP will require each party to an IRS to post a performance bond to cover their risk of loss. As the value of each party's position in an IRS may vary day to day as interest rates change, the CCP will adjust the amount of the performance bond as the risk of loss changes, requiring that one party post additional funds or receive a credit of funds previously posted. This is referred to as variation margin. Both the initial performance bond and the variation margin are based on the present value of the IRS. To value an IRS, the total value of all remaining fixed and floating coupon payments is determined and then discounted to create a net present value of that total amount. To assess the value of the remaining floating payments, a forecast curve is used which predicts, estimates or implies the value of the floating interest rate at each of the future payment dates. To determine the net present value of the fixed and floating payments, a discount curve is used which predicts, estimates, or implies prevailing future interest rates.

Once computed, the performance bond and subsequent variation margin is credited to, or collected from, each of the party and counter party to the IRS. While these funds are collected/paid with respect to the CCP, generally one party to the IRS benefits at the expense of the other party as the value of the IRS varies. To compensate for the burden of posting margin, the CCP may implement Price Alignment Interest. Price Alignment Interest ("PAI") is the overnight cost of funding collateral. It is debited from the receiver and transferred to the payer to cover the loss of interest on posted collateral, i.e. variation margin. As described above, as the value of the floating leg of an IRS varies over the life of the IRS, the net present value ("NPV") will change resulting in variation margin ("VM") being credited to one party and required/collected from the other party. PAI transfers the benefit of receiving VM back to the payer of the VM. PAI then is the overnight cost of funding the VM, debited from the receiver and transferred to the payer. PAI is generally not required for futures contracts, i.e. for a Futures trade, generally because the rules of a CCP typically define that each day the closing price of the contract is used to calculate VM, and the profit or loss is debited from the party's margin account daily. The exchange/CCP may regard this payment as full and final settlement of the contract, as should the counterparty default, the party will receive no further payment on this contract. This means a Futures trade is regarded as "final" or "matured" on each and every day, until the expiry date of the contract, in which case the VM payment is a settled amount, and not a margin asset. Accordingly, in this case, the receiver of VM are free to re-use any VM payment, as in the example above, without the PAI adjustment.

For an OTC IRS trade, the VM payment represents the value of future cash flows, which remain unsettled until each coupon date, and final maturity, so one may regard VM as an amount of margin which they would receive back should the value of the contract move in their favor. The difference in default, is that in some CCPs for OTC products, the portfolio of trades owned by the defaulting party (for direct members) are auctioned, such that eventually a new party takes ownership, and the contract continues unchanged until maturity. This means the VM payment for an OTC IRS trade is characterized as a margin asset, which one would expect not to lose should their counterparty default, hence the application of PAI, equivalent to receiving interest on this margin asset, is applied.

Should PAI be ignored by a CCP, the payer of VM would feel the penalty of clearing, which they wouldn't outside a CCP. PAI evens this out to some degree.

Accordingly, during the life of a cleared OTC IRS, there are several types of cash flows which occur, the coupon payments, the variation margin and the PAI. When computing variation margin and PAI, accurate computation of the net present value of the IRS's remaining coupon payments is important. Where the parties will fund these coupon payments in the same currency as required under the IRS, the valuation calculation merely requires appropriate forecasting and discounting curves for the appropriate interest rates in the home country of the currency. However, where the parties are funding their payments in a different currency then required under the IRS contract, the exchange rate between their desired currency and the requisite currency can affect the valuation of the IRS contract. Parties may wish to fund an IRS contract in a different currency, referred to as the "base" currency, then the currency required under the contract, referred to as the "local" currency, when, for example, the market for such IRS contracts is greater outside of the home country of the local currency. The currencies for which IRS contracts most heavily trade are referred to as the G17 currencies (as there are 17 currencies on this list) and includes dollars, Euros, Yen, Canadian Dollars, etc. Non-G17 currencies include, for example, Mexican Pesos.

Furthermore, in cleared OTC IRS trades, it is desirable that all of the cash flows, e.g. coupon payments, VM and PAI, occur in the same currency. This permits these cash flows to be netted or otherwise offset against each other which may reduce the magnitude, as well as simplify the computation, of the value to be moved among the parties the CCP, reduces the number of transactions to effect the cash flows where a particular cash flow is completely offset (effectively eliminating the need for the transaction), and lowers Herstatt risk as the CCP need not enter into any currency exchange transactions when facilitating the cash flows among the parties and the CCP. Reduction in transactions to effect the cash flows is particularly advantageous as it may correlate to a reduction in the consumption of computational resources and processing capacity allowing for increased transaction volume handling.

In order to clear OTC IRS trades which are funded in a base currency different from the local currency in which the cash flows occur, accurately valuing the IRS for calculation of VM, PAI, etc. requires accounting for the differences between the base and local currencies, while maintaining the resultant valuation denominated in the local currency such that the cash flows are all in the same currency.

As was discussed above, in order to value an IRS, the present value of cash flows of each leg of the transaction must be determined. In an IRS, the fixed leg is fairly straightforward since the cash flows are specified by the coupon rate set at the time of the agreement. Pricing the floating leg is more complex since, by definition, the cash flows change with future changes in the interest rates. The projected floating payments are based on the estimated yield curve of a market index rate, e.g. LIBOR, US Fed Funds, as of the measurement date, which is derived by bootstrapping the index's spot yield curve. Bootstrapping is a method utilized to construct a fixed-income yield curve using forward substitution whereby quoted periodic spot rates are used to estimate future spot rates based on a "no arbitrage" principal. The projected future cash flows are then discounted to a present value using a discount curve, i.e. discount factors for different maturities. Accordingly, two curves are necessary for valuing an IRS, a forecast curve, which accounts for future changes in the interest rate, used to value the cash flows of the floating leg and a discount curve used to calculate the net present values of the cash flows of the fixed and floating legs, the sum of which is the current value of the IRS. For IRS's denominated in one of the G17 currencies, such forecast and discount curves are well known and are based on well known indices for those currencies, e.g. LIBOR for Euros, US Fed Funds rate for dollars.

However, using these curves works well only when the IRS to be valued is funded in the same currency as the cash flows being exchanged. In other words, when an IRS having cash flows denominated in a local currency, e.g. Pesos, is funded in another base currency, e.g. dollars, using standard forecasting and discount curves based on local currency indices does not account for volatility in exchange rates between the local currency and the base currency. That is, a trader wishing to transact in local currency IRS's will first need to convert their funding from the base currency to the local currency prior to entering into such a transaction. Similarly, as they pay or collect payments according to the IRS terms, they will need to convert those payments between the local and base currency. In each situation, the trader (or their counter party) is exposed to risk due to volatility in exchange rates, referred to as Herstatt risk. As such contracts are typically entered into when there is a larger off-shore market for the IRS in the local currency than in the local/on-shore market, traders desire to transact in their home/base currency rather than in the local currency. To minimize risk due to exchange rate volatility, the disclosed embodiments utilize forecasting and discount curves which account for this volatility. This allows a party to an IRS to value the IRS in the local currency while accounting for the base currency. Such curves may essentially factor the exchange rates between the base and local currencies predicted to be prevailing at the time of each coupon payment. For example, a standard forecast curve based on the floating rate index and a standard discount curve based on the local currency institutional interest rats may be modified based on forecasted exchange rates derived from the foreign exchange market and/or cross-currency swap agreements for the local/base currencies taken from the swaps markets to provide discount and forecast curve values for the different tenors of the IRS contract.

In building these forecast and discount curves, for example, three instruments may be used as inputs, a "vanilla" IRS funded and denominated in the local currency, a local/base currency exchange forward contract and a local/base cross currency swap contract. For example, the vanilla IRS funded and denominated in the local currency may include the MXN TIIE Swap. The MXN TIIE Swap is a vanilla interest swap, the payment frequency is "28-day" month and the floating index referred to is the 28-day TIIE rate, which is the main interbank reference rate and calculated on a daily basis. TIIE Swaps serve as curve inputs for both discount and forecast curves. The local/base currency exchange forward contract may include the USD/MXN FC Forward contract wherein the FX Forward outright rate is calculated as the interest rate differential between Mexican Peso and US Dollar, using the interest rate parity. The local/base cross currency swap contract may include the USD/MXN Cross Currency Swap wherein the TIIE-Libor cross currency swap involves an exchange of floating rates in USD Libor 1M and MXN TIIE 28 Day. The quotation represents the basis points that are used as spread over Libor as equivalent to THE. In constructing the discount curve, such as for Mexican Pesos, from 0 up to 1 year, FX forward is used for the calculation of MXN discount curve. To cover longer tenor, TIIE-USD Libor 1M cross currency swap is employed, since liquidity of FX forward drops beyond 1Y. There are two curves taken as prerequisite for the MXN discount curve, which is USD Fed Funds Curve and USD Libor 1M curve. Those two curves are taken as foreign discount and forecast curve respectively. The forecast curve for Pesos may then be derived from the discount curve.

The disclosed embodiments may be used for implementing cleared IRS's funded in a base currency but with cash flows denominated in local currencies, e.g. where those IRS contracts are not widely traded in the local market, i.e. the country of the local currency, but instead are more widely traded in off-shore markets, i.e. the country of the base currency. It will be appreciated then that the disclosed embodiments may be utilized where the local and base currencies are any two different currencies, including those currencies which are used in more widely traded IRS contracts, e.g. typically those in the top 17 currencies, commonly referred to as the "G17", where there are substantial markets. However, in the typical case, the disclosed embodiments will be more likely used when the local currency is a lesser trader currency, e.g. a non-G17, currency. As such, the disclosed embodiments will be described with respect to exemplary IRS contracts denominated in Mexican Pesos ("MXN") but funded, or otherwise valued/collateralized in U.S. dollars ("USD"). While a bilateral MXN (non-cleared) IRS exists, a Cleared MXN IRS product does not exist in the marketplace that takes into account the off shore funding impact, the clearing process and cash flow movements into valuation. However, it will be appreciated that the disclosed embodiments are applicable to any cleared IRS denominated in a deliverable local currency, i.e. the cash flows (coupon payments, variation margin and PAI) occur in the local currency, but funded or otherwise collateralized/valued in a base currency different from the local currency, and in particular where the local currency is considered a non-G17 currency and the base currency is a G17 currency.

Specifically, the disclosed embodiments address the situation where the funding (collateral) for the swap instrument is in a different currency than the cash flows such as variation margin, coupon payments, and PAI. For example, the USD-MXN swap is funded in USD, but the cash flows are in MXN Peso. This example and the examples below use the USD-MXN Peso swap as an illustration, but the new method can be used for any deliverable currency outside of the G17 currencies.

As described above, it is not desirable to require market participants to fund such a cleared swap at an "offshore" (U.S.-based) clearing house with the "local" (in this case, MXN Peso) currency. It is also problematic to administer daily cash flows in the offshore currency because the PAI of the offshore currency will be subject to different overnight rates.

The disclosed embodiments provide a new mechanism for pricing cleared currency swaps which takes into account a conversion between USD and MXN Peso while still funding the instrument in USD and administering the daily cash flows in MXN Peso. In one embodiment, this mechanism employs the following steps:
1. MXN Swaps are priced using a USD funding. The MXN discount curve will take into account USD Overnight Index Swap rate ("OIS") and USD MXN basis and used to determine a MXN Net Present Value ("NPV").
2. For the MXN Peso, moving coupon payments are a contractual obligation, so all cash flows such as variation margin, coupon payments, and PAI will move in MXN Pesos.
3. USD funding is used for pricing, so the mechanism relies on a "fed fund" rate to compute the equivalent PAI amount using the following steps:
    a. Cumulative variation margin ("VM") is determined in Pesos;
    b. The method converts the VM to USD using the relevant foreign exchange ("FX") rate (FX0);
    c. Using the USD VM number from (b) and the Fed Funds rate, the PAI amount is computed in USD; and
    d. The USD VM and PAI amount are both converted back to Pesos using the relevant FX rate (FX1)

Note that the FX rate mentioned in steps 3b and 3d will be slightly different. FX0 is the cash FX rate at time T and FX1 is the FX rate for time T+1. FX0 is the FX overnight rate and FX1 is tomorrow's rate. These are the first two points used to construct the USDMXN cross-currency basis curve.

The steps above can also be accomplished by creating a MXN PAI rate which will be the Fed Funds rate adjusted by the FX0/FX1 rates as follows:

$$MXN\ PAI\ Rate = FedFund \cdot \frac{FX_1}{FX_0} + \frac{\frac{FX_1}{FX_0} - 1}{\frac{n}{260}}$$

Once the MXN PAI Rate is determined, it will plug into the normal PAI formula calculation as follows:

$$MXN\ PAI\ Amount = \frac{-MXN\ \text{Adjusted}\ NPV(\text{Previous Day}) \times MXN\ PAI\ \text{Rate} \times \#\ \text{of days from today to the next business day in}\ MXMC\ \text{calendar}}{360}$$

Overnight indexed swaps are interest rate swaps in which a fixed rate of interest is exchanged for a floating rate that is the geometric mean of a daily overnight rate. The calculation of the payment on the floating side is designed to replicate the aggregate interest that would be earned from rolling over a sequence daily loans at the overnight rate. In U.S. dollars, the overnight rate used is the effective federal funds rate (the federal funds rate is "the interest rate" at which depository institutions actively trade balances held at the Federal Reserve, called federal funds, with each other, usually overnight, on an uncollateralized basis. Institutions with surplus balances in their accounts lend those balances to institutions in need of larger balances. The interest rate that the borrowing bank pays to the lending bank to borrow the funds overnight is negotiated between the two banks, and the weighted average of this rate across all such transactions is the federal funds effective rate.). The "risk-free" term structure of interest rates is a key input to the pricing of derivatives. It is used for defining the expected growth rates of asset prices in a risk—neutral world and for determining the discount rate for expected payoffs in this world. Many banks now consider that overnight indexed swap (OIS) rates should be used as the risk—free rate when collateralized portfolios are valued.

While the disclosed embodiments may be discussed in relation to IRS contracts, it will be appreciated that the disclosed embodiments may be applicable to other bilateral contracts, equity, options or futures trading system or market now available or later developed.

It will be appreciated that the plurality of entities utilizing the disclosed embodiments, e.g. the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange. An exemplary trading network environment for implementing trading systems and methods is shown in FIG. 1. An exchange computer system 100 receives orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names and passwords. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A volume control module 140 may be included to, among other things, control the rate of acceptance of mass quote messages.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may include computer-executable instructions for receiving order information from a user and transmitting that order information to exchange computer system 100. In another example, the exemplary computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

As shown in FIG. 1, the Exchange computer system 100 further includes a risk management module 134 which may implement the disclosed mechanisms as will be described with reference to FIG. 2. It will be appreciated the disclosed embodiments may be implemented as a separate module or a separate computer system coupled with the Exchange computer system 100 so as to have access to the requisite portfolio data. As described above, the disclosed embodiments may be implemented as a centrally accessible system or as a distributed system where some of the disclosed functions are performed by the computer systems of the market participants.

Figure 2:
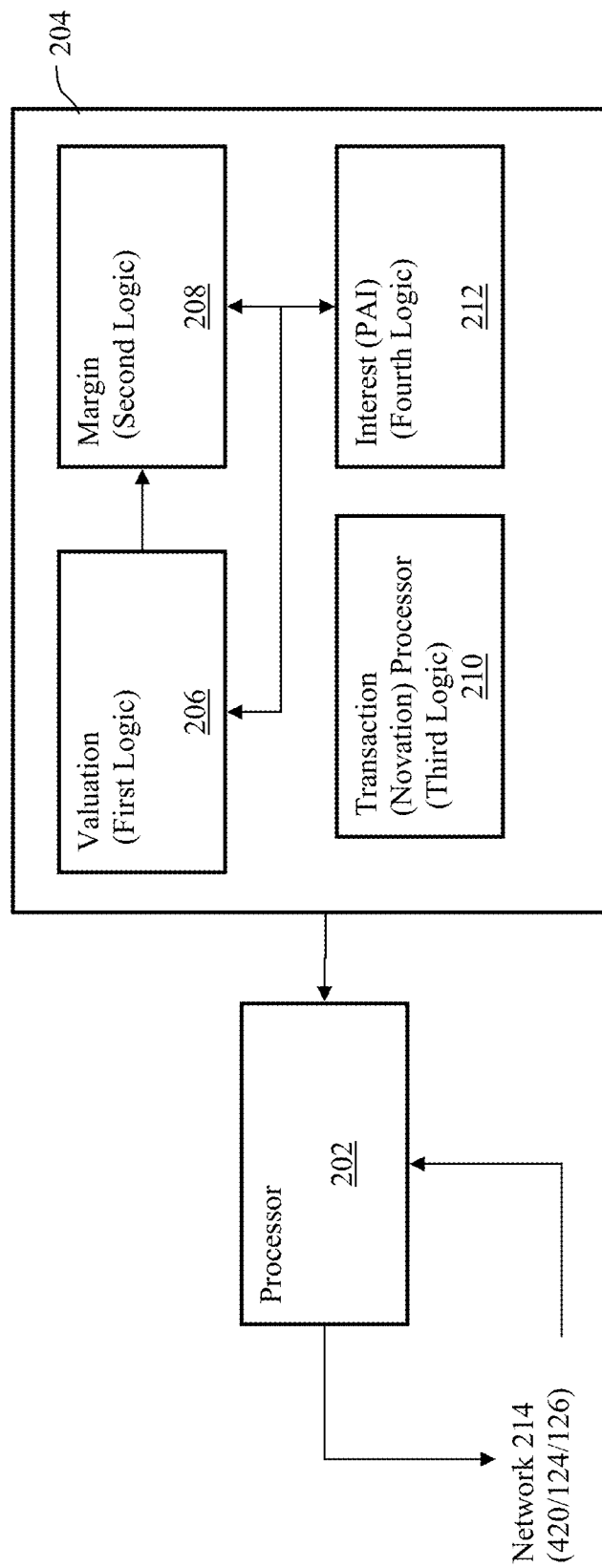
FIG. 2 depicts a block diagram of an exemplary implementation of the system of FIG. 1 for minimizing transactions relating to IRS positions.

FIG. 2 depicts a block diagram of a risk management module 134 according to one embodiment, which in an exemplary implementation, is implemented as part of the exchange computer system 100 described above. As used herein, an exchange 100 includes a place or system that receives and/or executes orders.

In particular, FIG. 2 depicts a block diagram of a system 200, which may also be referred to as an architecture, for minimizing transactions undertaken by an electronic trading system 100 of a central counter party with respect to an interest rate swap ("IRS") position, e.g. minimizing the transactions associates with effecting the cash flows thereof, the IRS position comprising one of a first obligation to, based on a notional amount denominated in a local currency, make each of a first series of periodic payments in the local currency based on a fixed interest rate and receive each of a second series of periodic payments in the local currency based on a floating interest rate and a second obligation to make each of the second series of periodic payments and receive each of the first series of periodic payments, wherein each of the first and second series of periodic payments is funded prior thereto in a base currency different from the local currency. In one embodiment, the system 200 includes a transaction processor 210, which may be implemented as a separate component or as one or more logic components, such as on an FPGA which may include a memory or reconfigurable component to store logic and processing component to execute the stored logic, or as third logic 210, e.g. computer program logic, stored in a memory 204, or other non-transitory computer readable medium, and executable by a processor 202, such as the processor 402 and memory 404 described below with respect to FIG. 4, to cause the processor 202 to, or otherwise be operative to, receive, from at least a first market participant, e.g. trader, an IRS transaction between the first market participant and a second market participant comprising the first and second obligations, and novate the IRS transaction, i.e. convert the first obligation into a third obligation to make each of the first series of periodic payments to an intermediary and receive each of the second series of periodic payments from the intermediary, and convert the second obligation into a fourth obligation to make each of the second series of periodic payments to the intermediary and receive each of the first series of periodic payments from the intermediary, wherein performance of either of the third or fourth obligations is not dependent upon performance of the other of the third or fourth obligations. That is, the central counter party of the electronic trading system 100 becomes the counter party to each side of the transaction and guarantees performance, etc. Each participant thereby then holds a position in the IRS contract comprising either the obligation to, based on a notional amount denominated in a local currency, make each of a first series of periodic payments in the local currency based on a fixed interest rate and receive each of a second series of periodic payments in the local currency based on a floating interest rate or the obligation to make each of the second series of periodic payments and receive each of the first series of periodic payments, wherein each of the first and second series of periodic payments is funded prior thereto in a base currency different from the local currency. As described herein, the computed variation margin amount is used to facilitate performance of either of the third or fourth obligations when performance of the other of the third or fourth obligations does not occur. The transaction processor 210 may be coupled with the match engine module 106 to receive matched IRS transactions for novation or such transactions may be receive via other mechanisms, such as via external matched transaction feeds (not shown). The transaction processor 210 may be further coupled with the user databases 102 and Account data module 104 in which each party's portfolio of positions is stored and wherein the valuation and margin processors 206 208, described below, access position data to perform the valuation and margining processes described herein.

Figure 4:
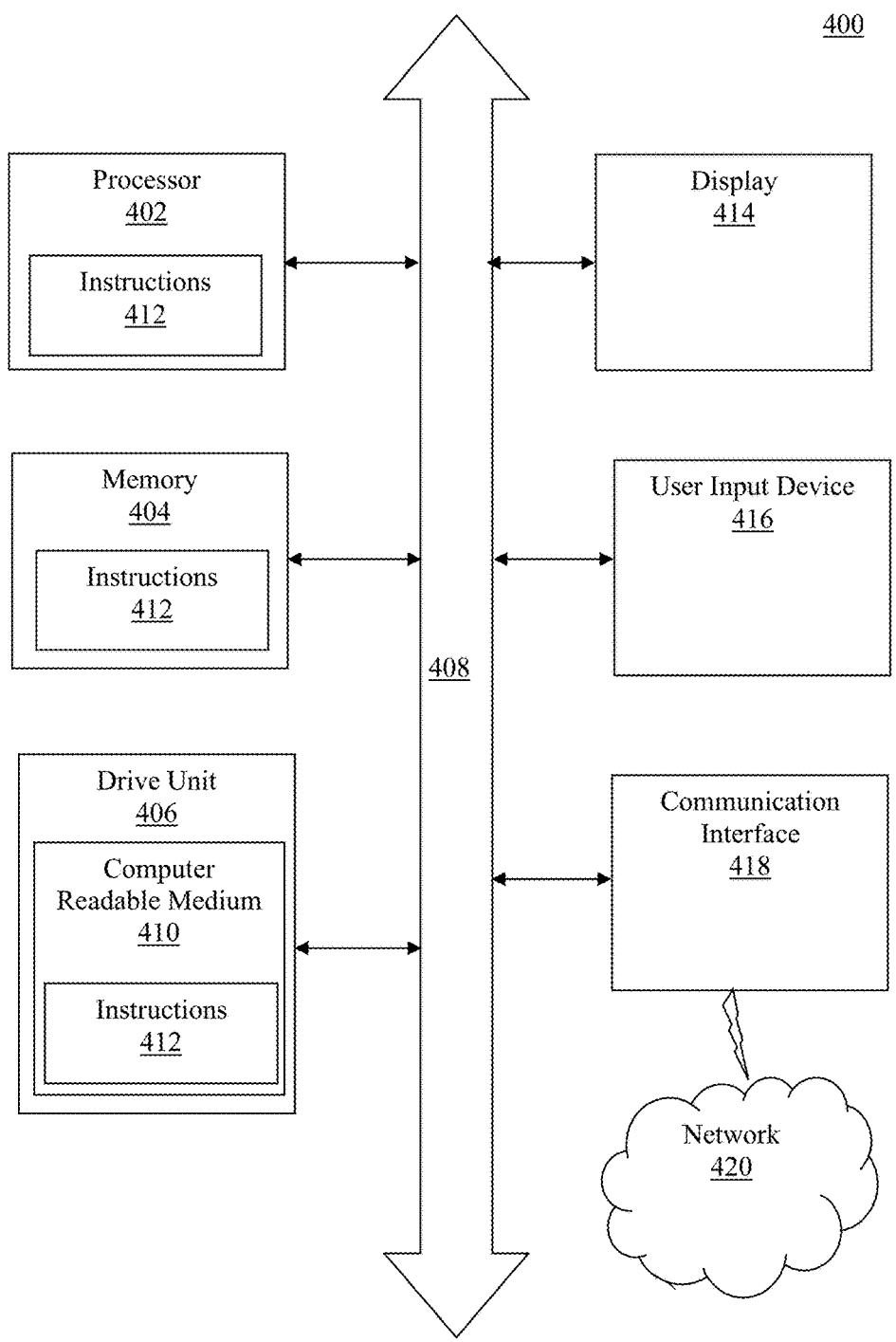
FIG. 4 shows an illustrative embodiment of a general computer system for use with the system of FIGS. 1 and 2.

The system 200 includes an valuation processor 206, which may be implemented as a separate component or as one or more logic components, such as on an FPGA which may include a memory or reconfigurable component to store logic and processing component to execute the stored logic, or as first logic 206, e.g. computer program logic, stored in a memory 204, or other non-transitory computer readable medium, and executable by a processor 202, such as the processor 402 and memory 404 described below with respect to FIG. 4, to cause the processor 202 to, or otherwise be operative to, compute a value, denominated in the local currency, of the IRS position as a function of a remainder of the first and second series of periodic payments being funded in the base currency.

The system 200 further includes a margin processor 208 coupled with the valuation processor 206, which may be implemented as a separate component or as one or more logic components, such as on an FPGA which may include a memory or reconfigurable component to store logic and processing component to execute the stored logic, or as second logic 208, e.g. computer program logic, stored in a memory 204, or other non-transitory computer readable medium, and executable by a processor 202, such as the processor 402 and memory 404 described below with respect to FIG. 4, to cause the processor 202 to, or otherwise be operative to, compute a variation margin amount based on a difference between the computed value and a previously computed value of the IRS position, the variation margin amount being denominated in the local currency; and wherein the margin processor 208 may be further operative to one of credit to, or collect from a participant holding the IRS position the computed variation margin amount.

In one embodiment, the local currency is pesos and the base currency is dollars. In one embodiment, the floating interest rate is based on a reference interest rate comprising one of a Fed Funds rate, a London Interbank Offered Rate ("LIBOR") or a Interbank Equilibrium Interest Rate ("TIIE") rate.

In one embodiment, the value of the IRS position and the variation margin amount may be computed and credited/collected periodically, e.g. daily.

In one embodiment, the value of the IRS position comprises a net present value of the IRS position.

In one embodiment, the valuation processor may be further operative to determine a first discounted value of a remainder of the first series of payments based on the fixed interest rate and an exchange rate between the local currency and the base currency expected to prevail when each of the remainder of the first series of payments is to be made, and determine a second discounted value of a remainder of the second series of payments based on a value of the floating interest rate and the exchange rate between the local currency and the base currency expected to prevail when each of the remainder of the second series of payments is to be made.

In one embodiment, the computing of the value of the IRS position may be further based on one or more of an IRS instrument comprising an obligation to, based on a notional amount denominated in the local currency, make each of a series of periodic payments in the local currency based on a fixed interest rate and receive each of another series of periodic payments in the local currency based on a floating interest rate and another obligation to make each of the series of periodic payments based on the fixed interest rate and receive each of the other series of periodic payments based on the floating interest rate, wherein each of the of periodic payments is funded prior thereto in local currency, exchange rates between the local and base currency expected to prevail in the future, and an IRS instrument comprising an obligation to, based on a notional amount denominated in the base currency, make each of a series of periodic payments in the base currency based on a fixed interest rate and receive each of another series of periodic payments in the local currency based on a floating interest rate and another obligation to make each of the series of periodic payments based on the fixed interest rate and receive each of the other series of periodic payments based on the floating interest rate.

In one embodiment, the credit or collection of the computed variation margin amount occurs in an account associated with the participant to or from which the first and second series of payments are made or received. In one embodiment, the credit of the computed variation margin amount may reduce and/or may eliminate, e.g. net or offset, at least one of the payments of the first or second series of periodic payments to be made.

In one embodiment, the value and the variation margin amount are computed and credited/collected periodically and each collected or credited computed variation margin amount is accumulated, the system 200 further including an interest processor 212, which may be implemented as a separate component or as one or more logic components, such as on an FPGA which may include a memory or reconfigurable component to store logic and processing component to execute the stored logic, or as fourth logic 208, e.g. computer program logic, stored in a memory 204, or other non-transitory computer readable medium, and executable by a processor 202, such as the processor 402 and memory 404 described below with respect to FIG. 4, to cause the processor 202 to, or otherwise be operative to, compute an amount of interest, denominated in the local currency, to be credited to or collected from the participant based on the cumulative computed variation margin amounts, wherein the computation of the amount of interest further comprises a conversion the cumulative computed variation margin amounts from the local currency into the base currency based on an exchange rate between the local currency and the base currency at a first time, e.g. an overnight rate, computation of an amount of interest denominated in the base currency based on the cumulative computed variation margin amounts denominated in the base currency and a base currency market interest rate and conversion of the computed amount of interest denominated in the base currency to the local currency based on an exchange rate between the local currency and the base currency at second time, e.g. tomorrow's rate, later than the first time.

In one embodiment, the credit or collection of the amount of interest denominated in the local currency occurs in an account associated with the participant to or from which the first and second series of payments are made or received. In one embodiment, the credit of the amount of interest denominated in the local currency may reduce and/or eliminate, e.g. net or offset, at least one of the payments of the first or second series of periodic payments to be made.

In one embodiment, wherein the value and the variation margin amount are computed and credited/collected periodically and each collected or credited computed variation margin amount is accumulated, the method further comprising computing, by the processor, an amount of interest, denominated in the local currency, to be credited to or collected from the participant based on the cumulative computed variation margin amounts, wherein the computation of the amount of interest further comprises:

Interest Rate=MarketRate×($FX1/FX0$)+(($FX1/FX0$)−1)/($n/360$)

where:
FX0=local/base currency exchange rate at time T,
FX1=local/base currency exchange rate at time T+1,
MarketRate=base currency governmental institutional rate; and Interest Amount(in local currency)=(Cumulative Computed Variation Amount(in local currency)× Interest Rate×No. of Days from Today to next business day)/360.

Figure 3:
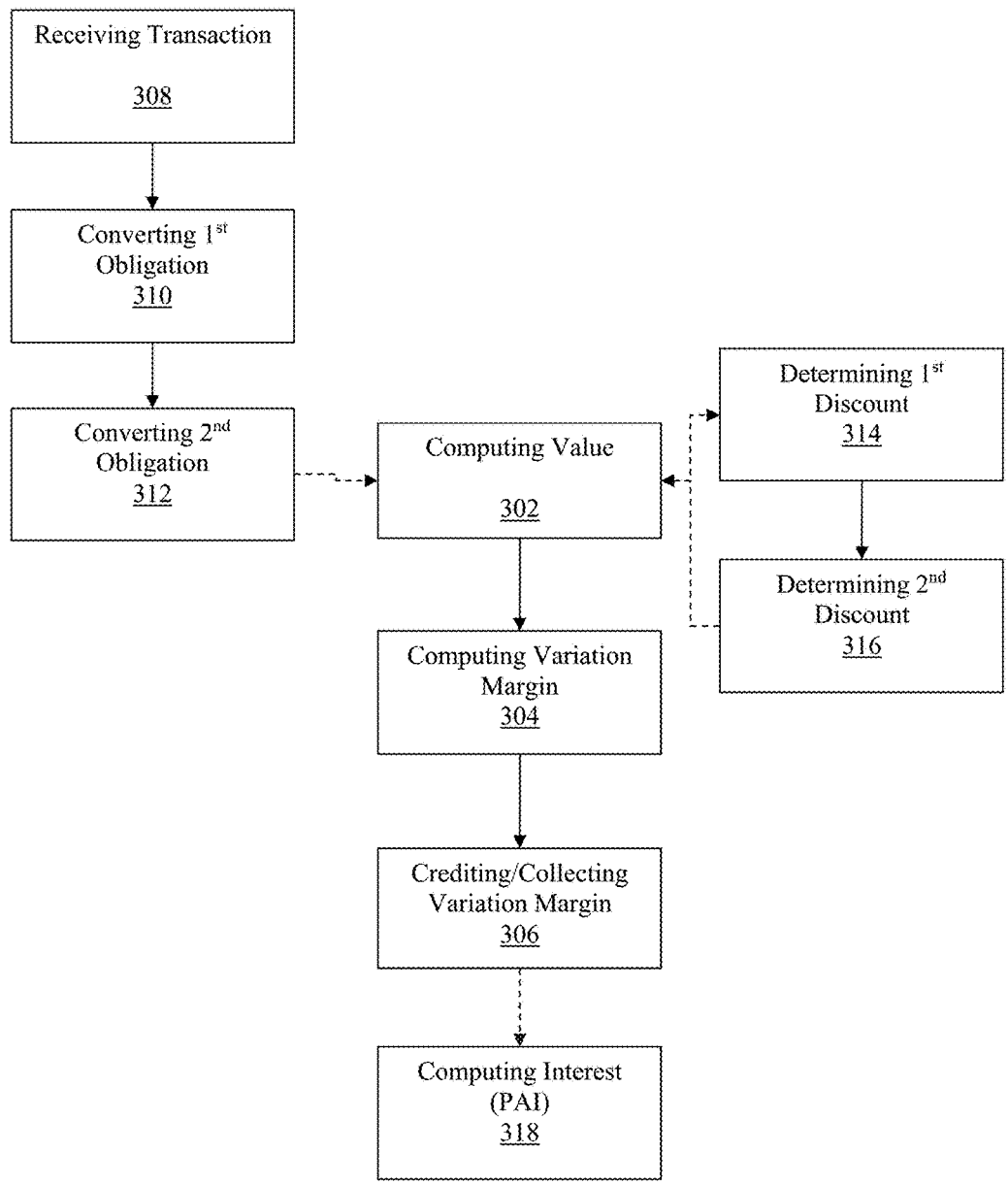
FIG. 3 depicts a flow chart showing operation of the system of FIGS. 1 and 2.

FIG. 3 depicts a flow chart showing operation of the system 200 of FIG. 2. In particular FIG. 3 shows a computer implemented method for minimizing transactions undertaken by an electronic trading system of a central counter party with respect to an interest rate swap ("IRS") position, e.g. minimizing the transactions associates with effecting the cash flows thereof, the IRS position comprising one of a first obligation to, based on a notional amount denominated in a local currency, make each of a first series of periodic payments in the local currency based on a fixed interest rate and receive each of a second series of periodic payments in the local currency based on a floating interest rate and a second obligation to make each of the second series of periodic payments and receive each of the first series of periodic payments, wherein each of the first and second series of periodic payments is funded prior thereto in a base currency different from the local currency As described above, the system 200 may be used, as described, to analyze all portfolios of all market participants, or a subset thereof. In one embodiment, the system 200 is used to analyze all, or a subset of, production portfolios of all, or a subset, of the clearing members of a clearing organization, such as CME clearing.

The operation, which may be performed periodically, e.g. daily, includes: computing, by a processor 201, a value, such as a net present value, denominated in the local currency, of the IRS position as a function of a remainder of the first and second series of periodic payments being funded in the base currency (Block 302); computing, by the processor 202, a variation margin amount based on a difference between the computed value and a previously computed value of the IRS position, the variation margin amount being denominated in the local currency (Block 304); and one of crediting to, or collecting from, by the processor 202, a participant holding the IRS position the computed variation margin amount (Block 306).

In one embodiment, the operation of the system 200 may further include receiving, by the processor 202, from a first participant, an IRS transaction between the first participant and a second participant comprising the first and second obligations (Block 308); converting, by the processor 202, the first obligation into a third obligation to make each of the first series of periodic payments to an intermediary and receive each of the second series of periodic payments from the intermediary (Block 310); converting, by the processor 202, the second obligation into a fourth obligation to make each of the second series of periodic payments to the intermediary and receive each of the first series of periodic payments from the intermediary (Block 312); and wherein performance of either of the third or fourth obligations is not dependent upon performance of the other of the third or fourth obligations.

In one embodiment, the computed variation margin amount is used to facilitate performance of either of the third or fourth obligations when performance of the other of the third or fourth obligations does not occur.

In one embodiment, the local currency is pesos and the base currency is dollars. In one embodiment, the floating interest rate is based on a reference interest rate comprising one of a Fed Funds rate, a London Interbank Offered Rate ("LIBOR") or a Interbank Equilibrium Interest Rate ("TIIE") rate.

In one embodiment, the operation of the system 200 may further include: determining, by the processor 202, a first discounted value of a remainder of the first series of payments based on the fixed interest rate and an exchange rate between the local currency and the base currency expected to prevail when each of the remainder of the first series of payments is to be made (Block 314); and determining, by the processor 202, a second discounted value of a remainder of the second series of payments based on a value of the floating interest rate and the exchange rate between the local currency and the base currency expected to prevail when each of the remainder of the second series of payments is to be made (Block 316).

In one embodiment, the operation of the system 200 may further include computing of the value of the IRS position further based on one or more of an IRS instrument comprising an obligation to, based on a notional amount denominated in the local currency, make each of a series of periodic payments in the local currency based on a fixed interest rate and receive each of another series of periodic payments in the local currency based on a floating interest rate and another obligation to make each of the series of periodic payments based on the fixed interest rate and receive each of the other series of periodic payments based on the floating interest rate, wherein each of the of periodic payments is funded prior thereto in local currency, exchange rates between the local and base currency expected to prevail in the future, and an IRS instrument comprising an obligation to, based on a notional amount denominated in the base currency, make each of a series of periodic payments in the base currency based on a fixed interest rate and receive each of another series of periodic payments in the local currency based on a floating interest rate and another obligation to make each of the series of periodic payments based on the fixed interest rate and receive each of the other series of periodic payments based on the floating interest rate.

In one embodiment, the crediting or collecting of the computed variation margin amount occurs in an account associated with the participant to or from which the first and second series of payments are made or received.

In one embodiment, the crediting of the computed variation margin amount may reduce and/or eliminate, e.g. net or offset, at least one of the payments of the first or second series of periodic payments to be made.

In one embodiment, the system 200 operates periodically, e.g. daily, and each collected or credited computed variation margin amount is accumulated, the operation of the system 200 may further include computing, by the processor 202, an amount of interest, denominated in the local currency, to be credited to or collected from the participant based on the cumulative computed variation margin amounts, wherein the computing of the amount of interest further comprises converting the cumulative computed variation margin amounts from the local currency into the base currency based on an exchange rate between the local currency and the base currency at a first time, e.g. an overnight rate, computing an amount of interest denominated in the base currency based on the cumulative computed variation margin amounts denominated in the base currency and a base currency market interest rate and converting the computed amount of interest denominated in the base currency to the local currency based on an exchange rate between the local currency and the base currency at second time, e.g. tomorrow's rate, later than the first time (Block 318).

In one embodiment, the crediting or collecting of the amount of interest denominated in the local currency occurs in an account associated with the participant to or from which the first and second series of payments are made or received. In one embodiment, the crediting of the amount of interest denominated in the local currency may reduce and/or eliminate at least one of the payments of the first or second series of periodic payments to be made.

In one embodiment where the system 200 operates periodically, e.g. daily, and each collected or credited computed variation margin amount is accumulated, the operation of the system may further include computing, by the processor, an amount of interest, denominated in the local currency, to be credited to or collected from the participant based on the cumulative computed variation margin amounts, wherein the computing of the amount of interest further comprises:

$$\text{Interest Rate} = \text{MarketRate} \times (FX1/FX0) + ((FX1/FX0) - 1)/(n/360)$$

where:
FX0=local/base currency exchange rate at time T,
FX1=local/base currency exchange rate at time T+1,
MarketRate=base currency governmental institutional rate; and $$\text{Interest Amount(in local currency)} = (\text{Cumulative Computed Variation Amount(in local currency)}) \times \text{Interest Rate} \times \text{No. of Days from Today to next business day}/360.$$

Figure 5:
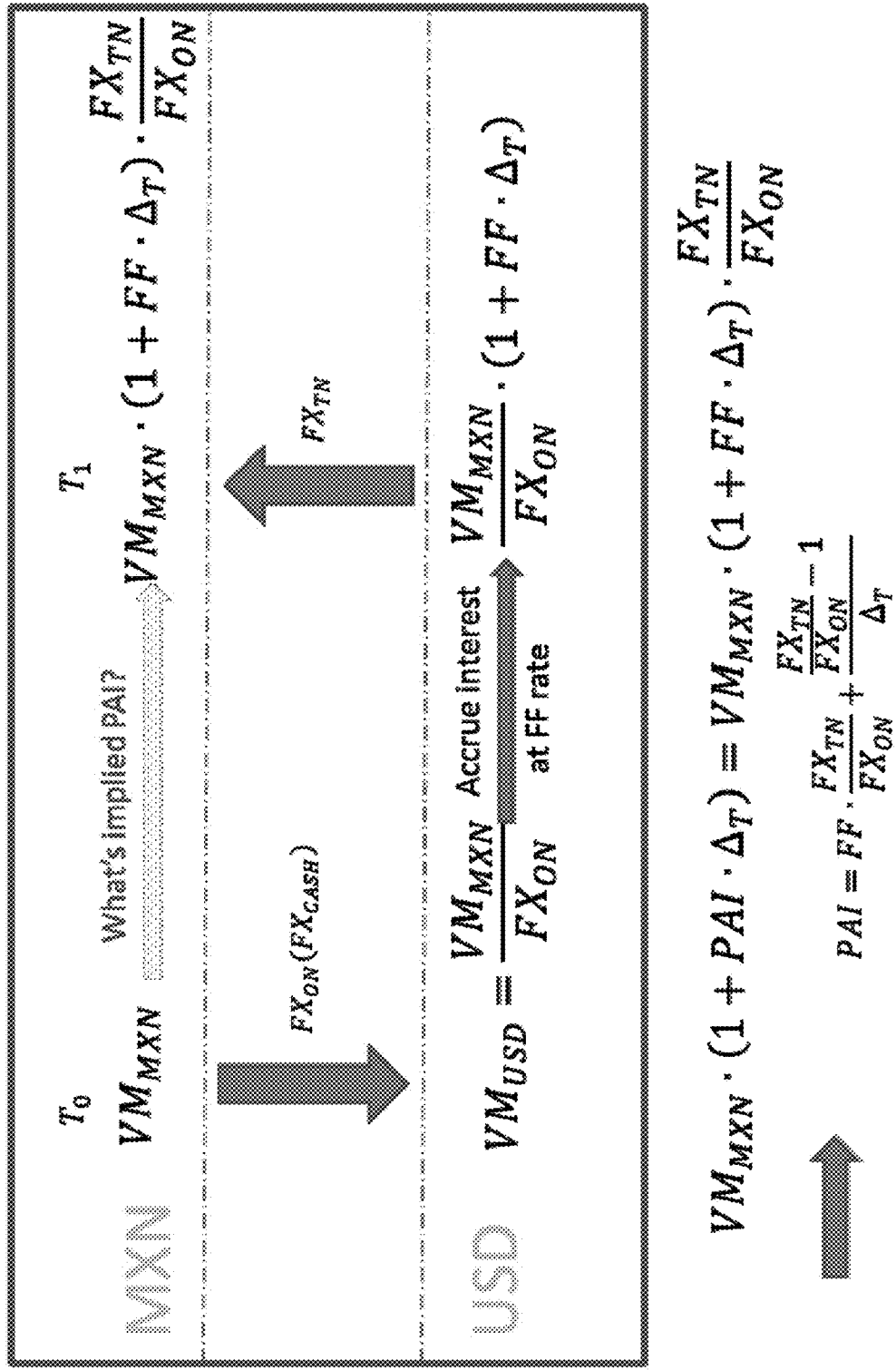
FIG. 5 shows an exemplary process for determining price aligned interest according to the disclosed embodiments.

FIG. 5 shows a diagram depicting calculation of PAI according to the disclosed embodiments, including conversion of variation margin in Mexican Pesos ($VM_{MXN}$) being converted to US dollars at time $T_0$ based on the overnight exchange rate ($FX_{ON}$), the computation of the PAI rate and conversion thereof back to Pesos at time $T_1$ based on the tomorrow night exchange rate ($FX_{TN}$) and the resultant computation of PAI based thereon.

Appendix A, incorporated by reference herein, shows a further example of the cash flows for an exemplary IRS according to the disclosed embodiments. The example illustrates the Valuation and Cash Flows of a MXN swap before and after the Coupon payment has settled. The example includes the Curve Instruments used in MXN Curve construction (described above) on given days of a swap, as well as an example of the PAI Rate calculation (described above). PAI is a component of the combined MXN cash flow (PAI, Coupon(s), Variation Margin, Upfront Fee) that can move through CME Clearing.

1. Cleared Date Oct. 1, 2014: This worksheet (pages 1 and 2) illustrates the MXN swap on the day it is cleared at CME
   a. Rows 11-12: Valuation and Cash Flows of the swap, to include: NPV, Adjusted NPV, PAI Rate, VM and Net Cash flow banked the next good Business Day
   b. Rows 15-33: The PV of current and future Coupon payments that are used to calculate the NPV of the swap
   c. Rows 35-80; Columns A-C: Curve Instruments and Quotes for both TIIE Forecasting and USDMXN Discounting
   d. Rows 35-44; Columns E and F: PAI rate calculation
2. Coupon Date—1: This worksheet (pages 1 and 2) illustrates the MXN swap on the business day before Coupon Payment Date
   a. Rows 11-12: Valuation and Cash Flows of the swap, to include: NPV, Adjusted NPV, PAI Rate and Amount, VM, PV of Coupons and Net Cash flow banked the next good Business Day
   b. Rows 15-33: The PV of current and future Coupon payments that are used to calculate the NPV of the swap
   c. Rows 35-80; Columns A-C: Curve Instruments and Quotes for both TIIE Forecasting and USDMXN Discounting
   d. Rows 35-44; Columns E and F: PAI rate calculation
3. Coupon Date Oct. 31, 2014: This worksheet (pages 1 and 2) illustrates the MXN swap on the Coupon Payment Date (both fixed and float)
   a. Rows 11-12: Valuation and Cash Flows of the swap, to include: NPV, Adjusted NPV, PAI Rate and Amount, VM, and Net Cash flow banked the next good Business Day
   b. Rows 15-33: The PV of current and future Coupon payments that are used to calculate the NPV of the swap
   c. Rows 35-80; Columns A-C: Curve Instruments and Quotes for both TIIE Forecasting and USDMXN Discounting
   d. Rows 35-44; Columns E and F: PAI rate calculation One skilled in the art will appreciate that one or more modules described herein may be implemented using, among other things, a tangible computer-readable medium comprising computer-executable instructions (e.g., executable software code). Alternatively, modules may be implemented as software code, firmware code, hardware, and/or a combination of the aforementioned. For example the modules may be embodied as part of an exchange 100 for financial instruments.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the processor 202, may be a computer system 400 or a component in the computer system 400. The computer system 400 may implement a match engine, margin processing, payment or clearing function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method, for use with a data transaction processing system of an electronic trading system of a central counter party in which a hardware clearing processor decomposes an incoming electronic transaction between first and second participants into separate electronic transactions between the first participant and the electronic trading system and the second participant and the electronic trading system, for minimizing transactions undertaken by the electronic trading system with respect to an electronic transaction comprising an interest rate swap ("IRS") position, the IRS position comprising one of a first obligation of the first participant to, based on a notional amount denominated in a local currency, make each of a first series of periodic payments in the local currency based on a fixed interest rate to the second participant and receive from the second participant each of a second series of periodic payments in the local currency based on a floating interest rate and a second obligation of the second participant to make each of the second series of periodic payments to the first participant and receive from the first participant each of the first series of periodic payments, wherein each of the first and second series of periodic payments is funded prior thereto in a base currency different from the local currency, the method comprising:

receiving, by a processor of the electronic trading system, from the first participant, the electronic transaction between the first participant and the second participant comprising the first and second obligations;

converting, by the processor, the first obligation into an electronic transaction comprising a third obligation to make each of the first series of periodic payments to the electronic trading system and receive each of the second series of periodic payments from the electronic trading system;

converting, by the processor, the second obligation into an electronic transaction comprising a fourth obligation to make each of the second series of periodic payments to the electronic trading system and receive each of the first series of periodic payments from the electronic trading system, wherein performance of the electronic transaction comprising either of the third or fourth obligations is not dependent upon performance of the other of the electronic transactions comprising the third or fourth obligations;

computing, by the processor, a value, denominated in the local currency, of the IRS position as a function of a remainder of the first and second series of periodic payments being funded in the base currency;

computing, by the processor, a variation margin amount based on a difference between the computed value and a previously computed value of the IRS position, the variation margin amount being denominated in the local currency; and one of crediting to, or collecting from, by the processor, one or both of the first and second participants the computed variation margin amount; and wherein when the crediting of the computed variation margin amount eliminates one of the payments of the first or second series of periodic payments to be made.

2. The computer implemented method of claim 1 wherein the computed variation margin amount is used to facilitate performance of either of the third or fourth obligations when performance of the other of the third or fourth obligations does not occur.

3. The computer implemented method of claim 1 wherein the local currency is pesos and the base currency is dollars.

4. The computer implemented method of claim 1 wherein the floating interest rate is based on a reference interest rate comprising one of a Fed Funds rate, a London Interbank Offered Rate ("LIBOR") or a Interbank Equilibrium Interest Rate ("TIIE") rate.

5. The computer implemented method of claim 1 wherein the method is performed periodically.

6. The computer implemented method of claim 5 wherein the method is performed daily.

7. The computer implemented method of claim 1 wherein the value comprises a net present value of the IRS position.

8. The computer implemented method of claim 1 wherein the computing of the value of the IRS position further comprises:

determining, by the processor, a first discounted value of a remainder of the first series of payments based on the fixed interest rate and an exchange rate between the local currency and the base currency expected to prevail when each of the remainder of the first series of payments is to be made; and determining, by the processor, a second discounted value of a remainder of the second series of payments based on a value of the floating interest rate and the exchange rate between the local currency and the base currency expected to prevail when each of the remainder of the second series of payments is to be made.

9. The computer implemented method of claim 8 wherein the computing of the value of the IRS position is further based on one or more of an IRS instrument comprising an obligation to, based on a notional amount denominated in the local currency, make each of a series of periodic payments in the local currency based on a fixed interest rate and receive each of another series of periodic payments in the local currency based on a floating interest rate and another obligation to make each of the series of periodic payments based on the fixed interest rate and receive each of the other series of periodic payments based on the floating interest rate, wherein each of the of periodic payments is funded prior thereto in local currency, exchange rates between the local and base currency expected to prevail in the future, and an IRS instrument comprising an obligation to, based on a notional amount denominated in the base currency, make each of a series of periodic payments in the base currency based on a fixed interest rate and receive each of another series of periodic payments in the local currency based on a floating interest rate and another obligation to make each of the series of periodic payments based on the fixed interest rate and receive each of the other series of periodic payments based on the floating interest rate.

10. The computer implemented method of claim 1 wherein the crediting or collecting of the computed variation margin amount occurs in an account associated with the participant to or from which the first and second series of payments are made or received.

11. The computer implemented method of claim 1 wherein the method is performed periodically and each collected or credited computed variation margin amount is accumulated, the method further comprising computing, by the processor, an amount of interest, denominated in the local currency, to be credited to or collected from the participant based on the cumulative computed variation margin amounts, wherein the computing of the amount of interest further comprises converting the cumulative computed variation margin amounts from the local currency into the base currency based on an exchange rate between the local currency and the base currency at a first time, computing an amount of interest denominated in the base currency based on the cumulative computed variation margin amounts denominated in the base currency and a base currency market interest rate and converting the computed amount of interest denominated in the base currency to the local currency based on an exchange rate between the local currency and the base currency at second time later than the first time.

12. The computer implemented method of claim 11 wherein the crediting or collecting of the amount of interest denominated in the local currency occurs in an account associated with the participant to or from which the first and second series of payments are made or received.

13. The computer implemented method of claim 11 wherein when the crediting of the amount of interest denominated in the local currency reduces one of the payments of the first or second series of periodic payments to be made.

14. The computer implemented method of claim 13 wherein when the crediting of the amount of interest denominated in the local currency eliminates one of the payments of the first or second series of periodic payments to be made.

15. The computer implemented method of claim 1 wherein the method is performed periodically and each collected or credited computed variation margin amount is accumulated, the method further comprising computing, by the processor, an amount of interest, denominated in the local currency, to be credited to or collected from the participant based on the cumulative computed variation margin amounts, wherein the computing of the amount of interest further comprises:

$$\text{Interest Rate} = \text{MarketRate} \times (FX_1/FX_0) + ((FX_1/FX_0) - 1)/(n/360)$$

where:

$FX_0$=local/base currency exchange rate at time T, $FX_1$=local/base currency exchange rate at time T+1, MarketRate=base currency governmental institutional rate; and Interest Amount(in local currency)=(Cumulative Computed Variation Amount(in local currency)× Interest Rate×No. of Days from Today to next business day)/360.

16. A system, for use with a data transaction processing system of an electronic trading system of a central counter party in which a hardware clearing processor decomposes an incoming electronic transaction between first and second participants into separate electronic transactions between the first participant and the electronic trading system and the second participant and the electronic trading system, for minimizing transactions undertaken by the electronic trading system with respect to an electronic transaction comprising an interest rate swap ("IRS") position, the IRS position comprising one of a first obligation of the first participant to, based on a notional amount denominated in a local currency, make each of a first series of periodic payments in the local currency based on a fixed interest rate to the second participant and receive from the second participant each of a second series of periodic payments in the local currency based on a floating interest rate and a second obligation of the second participant to make each of the second series of periodic payments and receive from the first participant each of the first series of periodic payments, wherein each of the first and second series of periodic payments is funded prior thereto in a base currency different from the local currency, the system comprising:

third logic stored in a memory and executable by a processor coupled with the memory to cause the processor to receive, from the first participant, the electronic transaction between the first participant and the second participant comprising the first and second obligations, convert the first obligation into an electronic transaction comprising a third obligation to make each of the first series of periodic payments to the electronic trading system and receive each of the second series of periodic payments from the electronic trading system, and convert the second obligation into an electronic transaction comprising a fourth obligation to make each of the second series of periodic payments to the electronic trading system and receive each of the first series of periodic payments from the electronic trading system, wherein performance of the electronic transaction comprising either of the third or fourth obligations is not dependent upon performance of the other of the electronic transactions comprising the third or fourth obligations;

first logic stored in the memory and executable by the processor to cause the processor to compute a value, denominated in the local currency, of the IRS position as a function of a remainder of the first and second series of periodic payments being funded in the base currency;

second logic stored in the memory and executable by the processor to cause the processor to compute a variation margin amount based on a difference between the computed value and a previously computed value of the IRS position, the variation margin amount being denominated in the local currency; and third logic stored in the memory and executable by the processor to cause the processor to one of credit to, or collect from one or both of the first and second participants the computed variation margin amount; and wherein when the crediting of the computed variation margin amount eliminates one of the payments of the first or second series of periodic payments to be made.

17. A system, for use with a data transaction processing system of an electronic trading system of a central counter party in which a hardware clearing processor decomposes an incoming electronic transaction between first and second participants into separate electronic transactions between the first participant and the electronic trading system and the second participant and the electronic trading system, for minimizing transactions undertaken by the electronic trading system with respect to an electronic transaction comprising an interest rate swap ("IRS") position, the IRS position comprising one of a first obligation of the first participant to, based on a notional amount denominated in a local currency, make each of a first series of periodic payments in the local currency based on a fixed interest rate to the second participant and receive from the second participant each of a second series of periodic payments in the local currency based on a floating interest rate and a second obligation of the second participant to make each of the second series of periodic payments and receive from the first participant each of the first series of periodic payments, wherein each of the first and second series of periodic payments is funded prior thereto in a base currency different from the local currency, the method comprising:

a transaction processor operative to receive, from the first participant, the electronic transaction between the first participant and the second participant comprising the first and second obligations, convert the first obligation into an electronic transaction comprising a third obligation to make each of the first series of periodic payments to the electronic trading system and receive each of the second series of periodic payments from the electronic trading system, and convert the second obligation into an electronic transaction comprising a fourth obligation to make each of the second series of periodic payments to the electronic trading system and receive each of the first series of periodic payments from the electronic trading system, wherein performance of the electronic transaction comprising either of the third or fourth obligations is not dependent upon performance of the other of the electronic transactions comprising the third or fourth obligations;

a valuation processor coupled with the transaction processor and operative to compute a value, denominated in the local currency, of the IRS position as a function of a remainder of the first and second series of periodic payments being funded in the base currency;

a margin processor coupled with the valuation processor and operative to compute a variation margin amount based on a difference between the computed value and a previously computed value of the IRS position, the variation margin amount being denominated in the local currency; and wherein the margin processor is further operative to one of credit to, or collect from one or both of the first and second participants the computed variation margin amount; and wherein when the crediting of the computed variation margin amount eliminates one of the payments of the first or second series of periodic payments to be made.

18. The system of claim 17 wherein the computed variation margin amount is used to facilitate performance of either of the third or fourth obligations when performance of the other of the third or fourth obligations does not Occur.

19. The system of claim 17 wherein the local currency is pesos and the base currency is dollars.

20. The system of claim 17 wherein the floating interest rate is based on a reference interest rate comprising one of a Fed Funds rate, a London Interbank Offered Rate ("LIBOR") or a Interbank Equilibrium Interest Rate ("TIIE") rate.

21. The system of claim 17 wherein the value and the variation margin amount are computed and credited/collected periodically.

22. The system of claim 21 wherein the method the value and the variation margin amount are computed and credited/collected daily.

23. The system of claim 17 wherein the value comprises a net present value of the IRS position.

24. The system of claim 17 wherein the valuation processor is further operative to determine a first discounted value of a remainder of the first series of payments based on the fixed interest rate and an exchange rate between the local currency and the base currency expected to prevail when each of the remainder of the first series of payments is to be made, and determine a second discounted value of a remainder of the second series of payments based on a value of the floating interest rate and the exchange rate between the local currency and the base currency expected to prevail when each of the remainder of the second series of payments is to be made.

25. The system of claim 24 wherein the computing of the value of the IRS position is further based on one or more of an IRS instrument comprising an obligation to, based on a notional amount denominated in the local currency, make each of a series of periodic payments in the local currency based on a fixed interest rate and receive each of another series of periodic payments in the local currency based on a floating interest rate and another obligation to make each of the series of periodic payments based on the fixed interest rate and receive each of the other series of periodic payments based on the floating interest rate, wherein each of the of periodic payments is funded prior thereto in local currency, exchange rates between the local and base currency expected to prevail in the future, and an IRS instrument comprising an obligation to, based on a notional amount denominated in the base currency, make each of a series of periodic payments in the base currency based on a fixed interest rate and receive each of another series of periodic payments in the local currency based on a floating interest rate and another obligation to make each of the series of periodic payments based on the fixed interest rate and receive each of the other series of periodic payments based on the floating interest rate.

26. The system of claim 17 wherein the credit or collection of the computed variation margin amount occurs in an account associated with the participant to or from which the first and second series of payments are made or received.

27. The system of claim 17 wherein the value and the variation margin amount are computed and credited/collected periodically and each collected or credited computed variation margin amount is accumulated, the system further comprising an interest processor operative to compute an amount of interest, denominated in the local currency, to be credited to or collected from the participant based on the cumulative computed variation margin amounts, wherein the computation of the amount of interest further comprises a conversion the cumulative computed variation margin amounts from the local currency into the base currency based on an exchange rate between the local currency and the base currency at a first time, computation of an amount of interest denominated in the base currency based on the cumulative computed variation margin amounts denominated in the base currency and a base currency market interest rate and conversion of the computed amount of interest denominated in the base currency to the local currency based on an exchange rate between the local currency and the base currency at second time later than the first time.

28. The system of claim 27 wherein the credit or collection of the amount of interest denominated in the local currency occurs in an account associated with the participant to or from which the first and second series of payments are made or received.

29. The system of claim 27 wherein when the credit of the amount of interest denominated in the local currency reduces one of the payments of the first or second series of periodic payments to be made.

30. The system of claim 29 wherein when the credit of the amount of interest denominated in the local currency eliminates one of the payments of the first or second series of periodic payments to be made.

31. The system of claim 17 wherein the value and the variation margin amount are computed and credited/collected periodically and each collected or credited computed variation margin amount is accumulated, the method further comprising computing, by the processor, an amount of interest, denominated in the local currency, to be credited to or collected from the participant based on the cumulative computed variation margin amounts, wherein the computation of the amount of interest further comprises:

$$\text{Interest Rate} = \text{MarketRate} \times (FX_1/FX_0) + ((FX_1/FX_0) - 1)/(n/360)$$

where:
$FX_0$=local/base currency exchange rate at time T,
$FX_1$=local/base currency exchange rate at time T+1,
MarketRate=base currency governmental institutional rate; and $$\text{Interest Amount(in local currency)} = \text{(Cumulative Computed Variation Amount(in local currency))} \times \text{Interest Rate} \times \text{No. of Days from Today to next business day}/360.$$

32. A system, for use with a data transaction processing system of an electronic trading system of a central counter party in which a hardware clearing processor decomposes an incoming electronic transaction between first and second participants into separate electronic transactions between the first participant and the electronic trading system and the second participant and the electronic trading system, for minimizing transactions undertaken by the electronic trading system with respect to an electronic transaction comprising an interest rate swap ("IRS") position, the IRS position comprising one of a first obligation of the first participant to, based on a notional amount denominated in a local currency, make each of a first series of periodic payments in the local currency based on a fixed interest rate to the second participant and receive from the second participant each of a second series of periodic payments in the local currency based on a floating interest rate and a second obligation of the second participant to make each of the second series of periodic payments to the first participant and receive from the first participant each of the first series of periodic payments, wherein each of the first and second series of periodic payments is funded prior thereto in a base currency different from the local currency, the system comprising:

means for receiving, from the first participant, the electronic transaction between the first participant and the second participant comprising the first and second obligations;

means for converting the first obligation into an electronic transaction comprising a third obligation to make each of the first series of periodic payments to the electronic trading system and receive each of the second series of periodic payments from the electronic trading system;

means for converting the second obligation into an electronic transaction comprising a fourth obligation to make each of the second series of periodic payments to the electronic trading system and receive each of the first series of periodic payments from the electronic trading system, wherein performance of the electronic transaction comprising either of the third or fourth obligations is not dependent upon performance of the other of the electronic transactions comprising the third or fourth obligations;

means for computing a value, denominated in the local currency, of the IRS position as a function of a remainder of the first and second series of periodic payments being funded in the base currency;

means for computing a variation margin amount based on a difference between the computed value and a previously computed value of the IRS position, the variation margin amount being denominated in the local currency; and means for one of crediting to, or collecting from one or both of the first and second participants the computed variation margin amount; and wherein when the crediting of the computed variation margin amount eliminates one of the payments of the first or second series of periodic payments to be made.

* * * * *